United States Patent
Kobayashi et al.

(10) Patent No.: US 11,136,271 B2
(45) Date of Patent: Oct. 5, 2021

(54) ALUMINUM NITRIDE PARTICLES

(71) Applicant: NGK Insulators, Ltd., Nagoya (JP)

(72) Inventors: Hiroharu Kobayashi, Kasugai (JP);
Kazuki Iida, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 98 days.

(21) Appl. No.: 16/575,768

(22) Filed: Sep. 19, 2019

(65) Prior Publication Data

US 2020/0010374 A1 Jan. 9, 2020

Related U.S. Application Data

(63) Continuation of application No. PCT/JP2017/011537, filed on Mar. 22, 2017.

(51) Int. Cl.
| | | |
|---|---|---|
| *C04B 35/581* | (2006.01) | |
| *C01B 21/072* | (2006.01) | |
| *C04B 35/63* | (2006.01) | |
| *C04B 35/64* | (2006.01) | |

(52) U.S. Cl.
CPC ........ *C04B 35/581* (2013.01); *C01B 21/0726* (2013.01); *C04B 35/6303* (2013.01); *C04B 35/64* (2013.01); *C01P 2004/20* (2013.01); *C01P 2004/54* (2013.01); *C01P 2006/12* (2013.01); *C01P 2006/80* (2013.01); *C04B 2235/3865* (2013.01); *C04B 2235/606* (2013.01); *C04B 2235/6562* (2013.01); *C04B 2235/661* (2013.01)

(58) Field of Classification Search
CPC .......................... C04B 35/581; C02B 21/072
See application file for complete search history.

(56) References Cited

U.S. PATENT DOCUMENTS

| | | | |
|---|---|---|---|
| 4,929,433 | A | 5/1990 | Hexemer, Jr. et al. |
| 5,649,278 | A | 7/1997 | Dunmead et al. |
| 5,710,382 | A | 1/1998 | Dunmead et al. |
| 2006/0175619 | A1 | 8/2006 | Fukuyama et al. |
| 2010/0215987 | A1 | 8/2010 | Fukuyama et al. |
| 2015/0353355 | A1 | 12/2015 | Fukunaga et al. |
| 2019/0270676 | A1* | 9/2019 | Kobayashi ............ C04B 35/581 |

(Continued)

FOREIGN PATENT DOCUMENTS

| | | |
|---|---|---|
| EP | 3 560 905 A1 | 10/2019 |
| JP | H02-023496 B2 | 5/1990 |
| JP | H02-503790 A1 | 11/1990 |

(Continued)

OTHER PUBLICATIONS

International Search Report and Written Opinion (Application No. PCT/JP2017/011537) dated Jun. 20, 2017.

(Continued)

*Primary Examiner* — Karl E Group
(74) *Attorney, Agent, or Firm* — Burr & Brown, PLLC (57) ABSTRACT

Aluminum nitride particles used as a material of an aluminum nitride sintered compact are disclosed. The aluminum nitride particles may have a same crystal orientation. The aluminum nitride particles each have an aspect ratio of 3 or more, a plate-like shape, a planar length of 0.6 μm or more and 20 μm or less, and a thickness length of 0.05 μm or more and 2 μm or less.

8 Claims, 3 Drawing Sheets

(56) References Cited

U.S. PATENT DOCUMENTS

2019/0276369 A1* 9/2019 Kobayashi ............ C04B 35/645
2021/0002138 A1* 1/2021 Kobayashi ............ C01B 21/072

FOREIGN PATENT DOCUMENTS

| JP | H05-139709 A1 | 6/1993 | |
|---|---|---|---|
| JP | H08-508460 A1 | 9/1996 | |
| JP | 2006-213586 A1 | 8/2006 | |
| JP | 2007-039292 A1 | 2/2007 | |
| JP | 2010-138056 A1 | 6/2010 | |
| JP | 2012-041254 A1 | 3/2012 | |
| WO | 95/19317 A1 | 7/1995 | |
| WO | 2014/123247 A1 | 8/2014 | |
| WO | WO-2019180937 A1 * | 9/2019 | ........... C01B 21/072 |

OTHER PUBLICATIONS

N. S. Raghavan, et al., "Preparation and Sintering of Aluminum Nitride Suitable for Electronic Substrate Purposes," *Materials Science & Engineering*, vol. B19, No. 3, Jun. 20, 1993, pp. 240-250.
Extended European Search Report (Application No. 17901815.5) dated Oct. 9, 2020.

* cited by examiner

| | Particle Shape | | | Specific Surface Area | Impurity Concentration | Oxygen Content | Crystal Orientation | Degree of Orientation | Relative Density | Impurity Concentration | Oxygen Content | Linear Transmittance |
|---|---|---|---|---|---|---|---|---|---|---|---|---|
| | L (μm) | D (μm) | L/D | m²/g | wt. % | wt. % | | % | % | wt. % | wt. % | % |
| Embodiment 1 | 5 | 0.07 | 71 | 9.0 | 0.043 | 0.85 | ○ | 100 | 100 | 0.01 | 0.04 | 67 |
| Embodiment 2 | 0.6 | 0.06 | 10 | 12.6 | 0.080 | 0.90 | ○ | 98 | 100 | 0.03 | 0.30 | 43 |
| Embodiment 3 | 2 | 0.08 | 25 | 8.4 | 0.052 | 0.87 | ○ | 100 | 100 | 0.02 | 0.10 | 65 |
| Embodiment 4 | 7 | 0.1 | 70 | 6.3 | 0.041 | 0.82 | ○ | 100 | 99.9 | 0.02 | 0.02 | 55 |
| Embodiment 5 | 10 | 0.3 | 33 | 2.2 | 0.046 | 0.77 | ○ | 100 | 99.8 | 0.03 | 0.17 | 40 |
| Embodiment 6 | 0.6 | 0.19 | 3 | 5.6 | 0.071 | 0.80 | ○ | 98 | 100 | 0.03 | 0.13 | 45 |
| Embodiment 7 | 2 | 0.4 | 5 | 2.2 | 0.047 | 0.76 | ○ | 100 | 100 | 0.02 | 0.07 | 66 |
| Embodiment 8 | 5 | 1.6 | 3 | 0.7 | 0.082 | 0.76 | ○ | 100 | 99.9 | 0.04 | 0.08 | 53 |
| Embodiment 9 | 2 | 0.2 | 10 | 3.8 | 0.040 | 0.78 | ○ | 100 | 99.8 | 0.01 | 0.05 | 55 |
| Embodiment 10 | 5 | 0.5 | 10 | 1.5 | 0.065 | 0.76 | ○ | 100 | 99.8 | 0.03 | 0.04 | 54 |
| Embodiment 11 | 20 | 1.9 | 11 | 0.4 | 0.087 | 0.75 | ○ | 100 | 99.8 | 0.03 | 0.17 | 51 |
| Embodiment 12 | 20 | 2 | 10 | 0.2 | 0.048 | 0.74 | ○ | 97 | 98.8 | 0.02 | 0.04 | 30 |
| Embodiment 13 | 2 | 0.2 | 10 | 3.8 | 0.092 | 0.79 | ○ | 98 | 100 | 0.04 | 0.18 | 40 |
| Embodiment 14 | 5 | 0.5 | 10 | 1.5 | 0.062 | 0.76 | ○ | 99 | 100 | 0.04 | 0.15 | 50 |
| Embodiment 15 | 20 | 0.05 | 400 | 12.3 | 0.070 | 0.90 | ○ | 100 | 99.9 | 0.03 | 0.28 | 55 |
| Embodiment 16 | 20 | 0.3 | 67 | 2.1 | 0.040 | 0.76 | ○ | 100 | 99.9 | 0.01 | 0.11 | 53 |
| Comparative Example 1 | 10 | 0.3 | 33 | 2.2 | 0.090 | 0.77 | × | 7 | 99.8 | 0.03 | 0.05 | 2 |
| Comparative Example 2 | 7.8 | 4.4 | 2 | 0.45 | 0.080 | 0.85 | ○ | 72 | 98 | 0.04 | 0.16 | 1 |
| Comparative Example 3 | 14 | 2.9 | 5 | 0.8 | 0.089 | 0.75 | ○ | 75 | 98 | 0.04 | 0.15 | 2 |
| Comparative Example 4 | 7 | 0.04 | 175 | 15.5 | 0.042 | 0.81 | ○ | 93 | 99.7 | 0.03 | 0.11 | 7 |

ALUMINUM NITRIDE PARTICLES

BACKGROUND OF THE INVENTION

1. Field of the Invention

The disclosure herein discloses art related to aluminum nitride particles. Especially, the disclosure herein discloses art related to aluminum nitride particles used as a material of an aluminum nitride sintered compact.

2. Description of Related Art

Aluminum nitride particles having a high aspect ratio (planar length L/thickness length D) are described in International Publication No. WO2014/123247A1 (hereinbelow termed Patent Document 1). Patent Document 1 describes aluminum nitride particles each having a planar length L of 3 to 110 μm and a thickness length D of 2 to 45 μm, and their aspect ratio L/D is 1.25 to 20. However, Patent Document 1 defines the planar length as "D" and the thickness length as "L", and the aspect ratio (LID) is less than 1 (0.05 to 0.8). The aluminum nitride particles of Patent Document 1 are used as thermally conductive fillers to be added to resin or as a material of a high-strength aluminum nitride sintered compact.

SUMMARY OF THE INVENTION

Technical Problem

As aforementioned, the aluminum nitride particles of Patent Document 1 are used as thermally conductive fillers to be added to resin or as a material of a high-strength aluminum nitride sintered compact. Due to this, the aluminum nitride particles of Patent Document 1 have a high aspect ratio and a large particle size. The present inventors began a study on manufacturing a component that requires high transparency by using aluminum nitride particles. That is, they began a study on manufacturing an aluminum nitride sintered compact with high transparency. However, as a result of the study by the present inventors, it has been found that it is difficult to manufacture an aluminum nitride sintered compact with high transparency by using conventional aluminum nitride particles. That is, it has been found that novel aluminum nitride particles that differ from the conventional ones are necessary in order to obtain an aluminum nitride sintered compact with high transparency. The disclosure herein provides aluminum nitride particles that can suitably be used as a material of an aluminum nitride sintered compact with high transparency.

Solution to Technical Problem

The description herein discloses aluminum nitride particles used as a material of an aluminum nitride sintered compact. The aluminum nitride particles may have a same crystal orientation. The aluminum nitride particles may each have an aspect ratio (L/D) of 3 or more; a plate-like shape; a planar length (L) of 0.6 μm or more and 20 μm or less, and a thickness length (D) of 0.05 μm or more and 2 μm or less. The "planar length" refers to a maximum length on a front surface of the aluminum nitride particle having the plate-like shape. Further the "thickness length" refers to a length from the front surface to a rear surface of the aluminum nitride particle having the plate-like shape.

In order to increase transparency of an aluminum nitride sintered compact, directions of crystallographic axes (crystal orientations) need to have the same orientation. In order to do so, crystal orientations of aluminum nitride particles, which is a material of the aluminum nitride sintered compact, need to be the same in one direction. However, even with the respective aluminum nitride particles having the same crystal orientation, if the aluminum nitride particles are arranged randomly within a pre-firing compact having a predetermined shape in manufacture of the pre-firing compact by using the aluminum nitride particles, crystal orientations in the resulting aluminum nitride sintered compact are disarranged and the transparency of the aluminum nitride sintered compact is thereby decreased.

Figure 1:
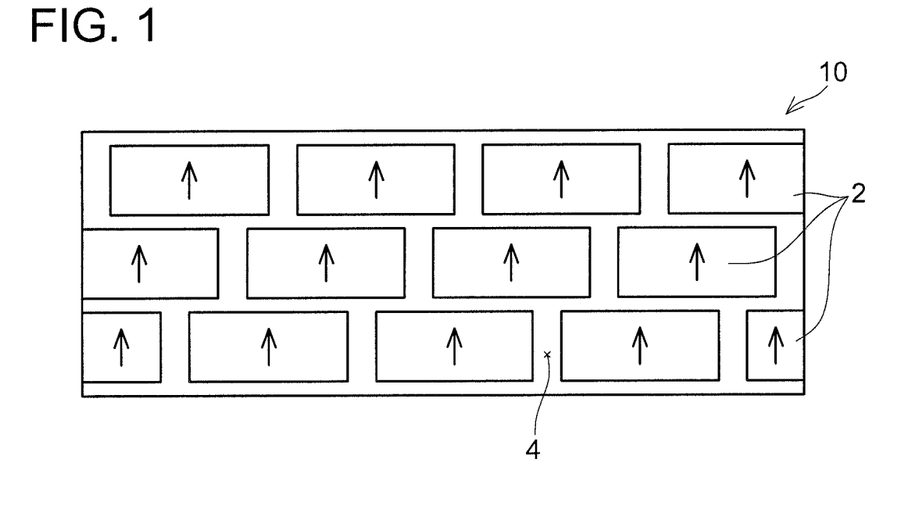
FIG. 1 shows a diagram for explaining crystal orientations in a pre-firing compact.
Figure 2:
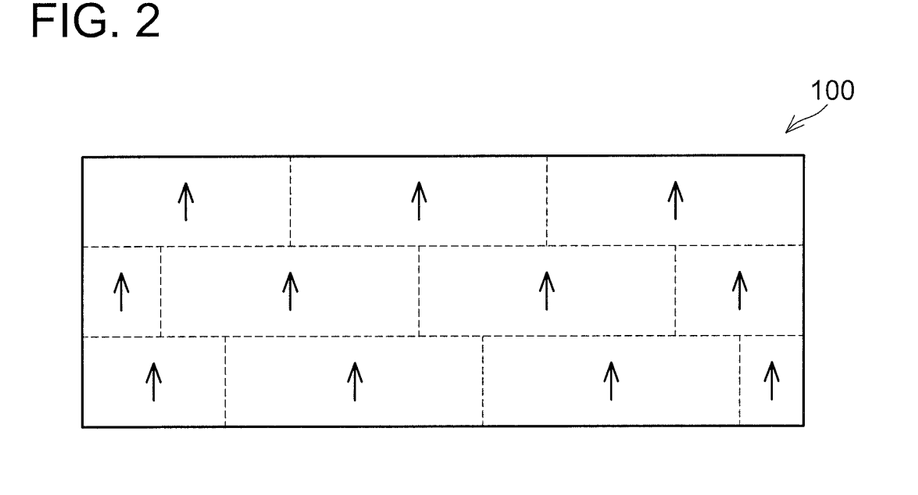
FIG. 2 shows a diagram for explaining crystal orientations in an aluminum nitride sintered compact.

For example, as in a pre-firing compact 10 shown in FIG. 1, if crystal orientations of respective aluminum nitride particles 2 (the crystal orientations are shown by arrows) are the same and the respective aluminum nitride particles 2 are arranged regularly (to have their front surfaces opposed to each other) with the same crystal orientation, crystal orientations in an aluminum nitride sintered compact 100 are also the same after firing as in the aluminum nitride sintered compact 100 shown in FIG. 2, and transparency thereof is high. Broken lines partition the aluminum nitride sintered compact 100 do not indicate crystal grain boundaries. FIG. 2 merely partitions the aluminum nitride sintered compact 100 by the broken lines to show that the aluminum nitride sintered compact 100 is constituted of the aluminum nitride particles 2 (FIG. 1) that have undergone particle growth.

As shown in FIG. 1, gaps 4 are present between the respective aluminum nitride particles 2 in the pre-firing compact 10. Auxiliary agent and pores that are necessary for sintering are present in the gaps 4. Even when the aluminum nitride particles are regularly arranged with the same crystal orientation, the transparency of the aluminum nitride sintered compact decreases if the auxiliary agent and/or pores remain in the aluminum nitride sintered compact after firing. Pores remaining in the aluminum nitride sintered compact may decrease a density of the aluminum nitride sintered compact (relative density with respect to its theoretical density), and a thermal conductivity thereof may be thereby degraded.

Figure 3:
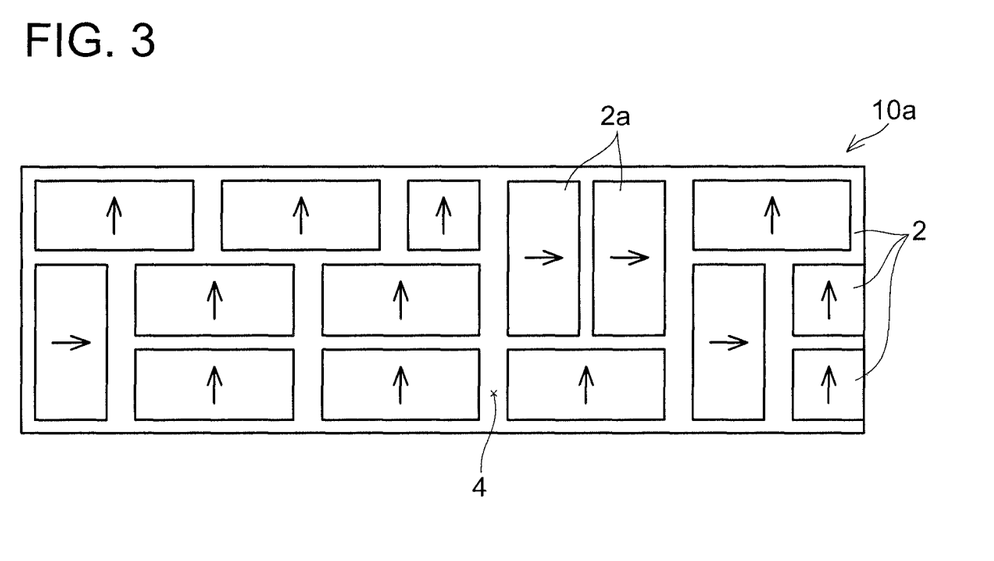
FIG. 3 shows a diagram for explaining crystal orientations in a pre-firing compact.

As in a pre-firing compact 10a shown in FIG. 3, in a case where crystal orientations are the same among the aluminum nitride particles 2 and crystal orientations are the same among aluminum nitride particles 2a but the aluminum nitride particles 2, 2a are not arranged regularly (front surfaces of the aluminum nitride particles 2, 2a are not opposed to each other), crystal orientations in a post-firing aluminum nitride sintered compact are disarranged, and transparency thereof is thereby decreased.

Figure 4:
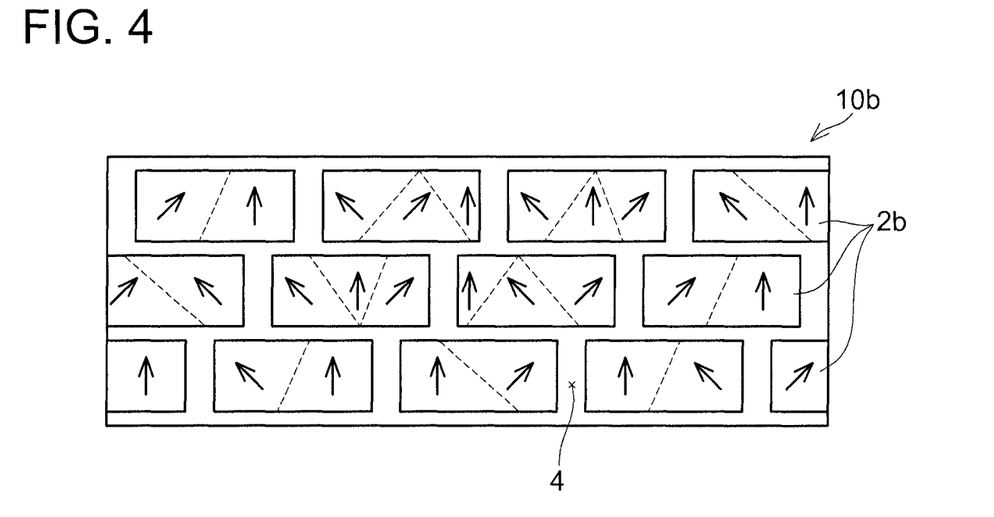
FIG. 4 shows a diagram for explaining crystal orientations in a pre-firing compact.

Alternatively, as in a pre-firing compact 10b shown in FIG. 4, in a case where crystal orientations in each aluminum nitride particle 2b are not the same, crystal orientations in an aluminum nitride sintered compact after firing are disarranged and transparency of the aluminum nitride sintered compact is thereby decreased. Typically, polycrystal aluminum nitride particles each have irregular crystal orientations therein as in the aluminum nitride particles 2b. Due to this, typically, aluminum nitride particles, in each of which crystal orientations are the same, as in the aluminum nitride particles 2 are often monocrystalline aluminum nitride particles.

Since crystal orientations in each of the aluminum nitride particles disclosed herein are the same, a situation that occurs with the pre-firing compact 10b does not occur. Further, since the aspect ratio is 3 or more, an irregular arrangement of the aluminum nitride particles, as in the pre-firing compact 10a, is suppressed. Further, the aluminum nitride particles disclosed herein each have the plate-like shape, the planar length of 0.6 μm or more and 20 μm or less, and the thickness length of 0.05 μm or more and 2 μm or less. Due to this, sintering easily occurs when a pre-firing compact is fired, and an aluminum nitride sintered compact with high density (less pores) can be obtained. By using the above-described aluminum nitride particles, an aluminum nitride sintered compact with high density in which crystal orientations are the same, that is, an aluminum nitride sintered compact with high transparency, can be obtained.

A surface area of the aluminum nitride particles may be 0.4 m²/g or more and 16 m²/g or less. Setting the surface area to 0.4 m²/g or more can easily cause sintering of the aluminum nitride particles upon firing. Further, setting the surface area of each aluminum nitride particle to 16 m²/g or less suppresses the aluminum nitride particles from aggregating, and thus the aluminum nitride particles can easily be oriented within the pre-firing compact.

A metal impurity concentration in the aluminum nitride particles may be 0.2 mass % or less. When the aluminum nitride particles contain a large amount of metal impurities, a metal impurity concentration in the resulting aluminum nitride sintered compact also becomes high. The aluminum nitride sintered compact containing a large amount of metal impurities has decreased transparency. When the metal impurity concentration in the aluminum nitride particles is 0.2 mass % or less, the transparency of the aluminum nitride sintered compact can be maintained high.

An oxygen concentration in the aluminum nitride particles may be 2 mass % or less. When the aluminum nitride particles contain a large amount of oxygen, an oxygen concentration in the resulting aluminum nitride sintered compact also becomes high. The aluminum nitride sintered compact containing a large amount of oxygen also has decreased transparency. When the oxygen concentration in each aluminum nitride particles is 2 mass % or less, the transparency of the aluminum nitride sintered compact can be maintained high.

DETAILED DESCRIPTION OF THE INVENTION

Hereinbelow, embodiments of the art disclosed herein will be described.

The disclosure herein discloses aluminum nitride particles used as a material of an aluminum nitride sintered compact. In manufacture of the aluminum nitride sintered compact, firstly a pre-firing compact having a predetermined size is formed by using the aluminum nitride particles. The pre-firing compact is formed, for example, by applying slurry containing the aluminum nitride particles on a film and drying the same, laminating compacts detached from the film until the lamination reaches a predetermined thickness, and performing isostatic pressing thereon. After a forming auxiliary agent that was added when the compacts were formed is degreased, the pre-firing compact is fired at a predetermined temperature under pressure, by which aluminum nitride is sintered and the particles are grown, and then a primary aluminum nitride sintered compact with high density (less pores) is thereby formed. After this, the primary aluminum nitride sintered compact is subjected to secondary firing without application of pressure to remove sintering auxiliary agent, as a result of which an aluminum nitride sintered compact is obtained. The aluminum nitride particles can be manufactured by heating a material containing aluminum oxide and carbon source under an atmosphere containing nitrogen source. Specifically, the aluminum nitride particles can be manufactured by a reaction shown in the following formula (1).

$$Al_2O_3 + 3C + N_2 \rightarrow 2AlN + 3CO \tag{1}$$

(Material Containing Aluminum Oxide)

The material containing aluminum oxide simply needs to contain aluminum oxide therein, thus it may be simple aluminum oxide that does not contain any other substances (excluding inevitable impurities), or it may contain other substance(s) therein. For example, the material containing aluminum oxide may contain 70 mass % or more aluminum oxide, 80 mass % or more aluminum oxide, 90 mass % or more aluminum oxide, or 95 mass % or more aluminum oxide. Further, a crystal structure of the aluminum oxide may be any of α type, γ type, θ type, η type, κ type, or χ type, and may especially be α type or γ type. Especially, using α alumina, γ alumina or boehmite as the aluminum oxide can lead to excellent reactivity. Hereinbelow, the "material containing aluminum oxide" will simply be termed an aluminum oxide material.

(Shape of Aluminum Oxide Material)

A shape of the aluminum oxide material may be a plate-like shape and may have a high aspect ratio. The aspect ratio may be 3 or more, 5 or more, 10 or more, 30 or more, 50 or more, 70 or more, 100 or more, or 120 or more. Although it depends on intended application of the aluminum nitride particles, use of the aluminum oxide material with a high aspect ratio (with the aspect ratio of 3 or more) allows aluminum nitride particles with a high aspect ratio to be obtained. The aluminum nitride particles having the plate-like shape and the high aspect ratio can be oriented by using doctor blade or the like, and thus can suitably be used as a material of a product which requires control of crystallographic axis directions (crystal orientations) (such as an aluminum nitride sintered compact with high transparency).

A size of the aluminum oxide material may have a planar length L of 0.2 μm or more, 0.6 μm or more, 2 μm or more, 5 μm or more, 10 μm or more, or 15 μm or more. Further, the planar length L may be 50 μm or less, 20 μm or less, 18 μm or less, or 15 μm or less. Further, a thickness length D may be 0.05 μm or more, 0.1 μm or more, 0.3 μm or more, 0.5 μm or more, or 0.8 μm or more. Further, the thickness length D may be 2 μm or less, 1.5 μm or less, or 1.0 μm or less. The size of the aluminum oxide material is reflected to a size of synthesized aluminum nitride particles. Due to this, the size of the aluminum oxide material can suitably be selected depending on the intended application of the aluminum nitride particles. The aspect ratio is expressed as (planar length L/thickness length D).

(Carbon Source)

The carbon source is used as a reducing agent for the aluminum oxide. The carbon source may be any carbon source so long as it can contact the aluminum oxide material in an environment for synthesizing the aluminum nitride particles (heating the aluminum oxide). For example, the carbon source may be a solid substance to be mixed in the aluminum oxide material. Alternatively, the carbon source may be carbide gas supplied to the environment for synthesizing the aluminum nitride particles (synthesizing atmosphere). Alternatively, the carbon source may be a component constituted of carbon that contacts the aluminum oxide material under the synthesizing atmosphere, such as a container accommodating the aluminum oxide material, a jig arranged within such a container, or the like.

As the solid carbon source to be mixed into the aluminum oxide material, carbon black and/or graphite may be used. As the carbon black, carbon black and/or acetylene black obtained by a furnace method or a channel method may be used. A particle diameter of the carbon black is not particularly limited, however, it may be 0.001 to 200 μm. Organic compounds may be used as the solid carbon source to be mixed into the aluminum oxide material. For example, as the carbon source, synthetic resin condensation compounds such as phenol resin, melamine resin, epoxy resin, and furan-phenol resin; hydrocarbon compounds such as pitch and tar; and/or organic compounds such as cellulose, sucrose, polyvinylidene chloride, and polyphenylene may be used. Among the aforementioned solid carbon sources, carbon black is especially useful since it has excellent reactivity.

When the solid carbon source is mixed into the aluminum oxide material, a solvent such as water, methanol, ethanol, isopropyl alcohol, acetone, toluene, or xylene may be used for the mixing. Due to this, a contact state between the aluminum oxide material and the carbon source can be improved. After the mixing, the mixed material may be dried by using an evaporator or the like.

As the carbide gas, straight chain hydrocarbons such as methane, ethane, propane, butane, and ethylene; alcohols such as methanol, ethanol, and propanol; or aromatic hydrocarbons such as benzene and naphthalene may be used. The straight chain hydrocarbons are especially useful because they are thermally decomposed easily. Using hydrocarbon gas as the carbon source allows the aluminum oxide material and the carbon source to be brought into excellent contact, by which a manufacturing time of the aluminum nitride particles can be shortened. As the hydrocarbon gas, fluorides such as fluorocarbon ($CF_4$) and fluorohydrocarbon ($CH_3F_4$) may be used.

(Nitrogen Source)

As the nitrogen source, nitrogen gas, ammonia gas, or mixed gas thereof may be used. The ammonia gas is cheap and easy to handle, thus it is especially useful as the nitrogen source. Further, using the ammonia gas as the nitrogen source improves reactivity, by which the manufacturing time of the aluminum nitride particles can be shortened.

(Nitriding Temperature)

A nitriding temperature (retention temperature) may be 1200° C. or more, 1300° C. or more, 1400° C. or more, 1500° C. or more, or 1600° C. or more. Prolongation of the manufacturing time and residual of unreacted aluminum oxide can be suppressed. Further, the nitriding temperature may be 1900° C. or less, 1800° C. or less, or 1700° C. or less. Inconsistency in crystal orientations (that is, polycrystallization of the aluminum nitride particles) can be suppressed. A nitriding time (retention time) may be 3 hours or more, 5 hours or more, or 8 hours or more from a viewpoint of suppressing residual of unreacted aluminum oxide. Further, the nitriding time may be 20 hours or less, 15 hours or less, or 10 hours or less from an industrial viewpoint.

A temperature elevation rate from a temperature at which the reductive nitriding reaction of aluminum oxide starts (900° C.) to the nitriding temperature may be 150° C./hr or less. For example, in a case where the nitriding temperature is 1600° C., the temperature is elevated from 900° C. to 1600° C. at the rate of 150° C./hr or less, and then the temperature is maintained at 1600° C. for a predetermined time. Making a temperature elevation time from the initial phase of nitriding to the nitriding temperature long allows manufacture of monocrystalline aluminum nitride particles with the same crystal orientation. A temperature elevation rate up to 900° C. may be faster than 150° C./hr. For example, the temperature may be elevated from a room temperature to 900° C. at a first temperature elevation rate (which is more than 150° C./hr) and may be elevated from 900° C. to the nitriding time at a second temperature elevation rate (which is 150° C./hr or less). By switching the temperature elevation rates, a time required for manufacturing the aluminum nitride particles (specifically, a time required for the temperature to reach 900° C.) can be shortened.

(Post-Heat Treatment)

After synthesized, the aluminum nitride particles may be heated (heat treated) in open air or in oxygen atmosphere to remove residual carbon within the obtained aluminum nitride particles. This heat treatment is especially useful in the case where the carbon source is the solid substance mixed in the aluminum oxide material. A temperature for the post-heat treatment may be 500° C. or more, 600° C. or more, or 700° C. or more from a viewpoint of removing residual carbon surely. Further, the temperature for the post-heat treatment may be 900° C. or less or 800° C. or less from a viewpoint of suppressing oxidation of aluminum nitride particle surfaces. A post-heat treatment time may suitably be selected according to the temperature for the post-heat treatment, and may be 3 hours or more, for example.

(Shape of Aluminum Nitride Particles)

The aluminum nitride particles simply need to have the same crystal orientation. When the crystal orientations of the aluminum nitride particles are the same, crystal orientations in the aluminum nitride sintered compact can be made the same by regularly arranging the aluminum nitride particles in the pre-firing compact. By making the crystal orientations in the aluminum nitride sintered compact the same, the aluminum nitride sintered compact with high transparency is obtained. In other words, unless the crystal orientations of the aluminum nitride particles are the same, the crystal orientations in the aluminum nitride sintered compact are not made to be the same even if the aluminum nitride particles are regularly arranged in the pre-firing compact, by which the transparency decreases (see FIG. 3). A c axis of aluminum nitride crystal may be on the particle front surfaces (a surface with a largest area among surfaces constituting each particle). That is, the c axis may extend in a thickness direction of the aluminum nitride particles (a direction substantially perpendicular to the particle front surfaces). Determination on whether the crystal orientations are the same or not may be made by mapping electronic images obtained by a Scanning Electron Microscope (SEM) for each crystal orientation by using Electron BackScatter Diffraction (EBSD) and based on a ratio of a particular crystal orientation to the total.

The aluminum nitride particles may have a plate-like shape and an aspect ratio (L/D) of 3 or more. That is, a ratio of a planar length (maximum length of front and rear surfaces) L to a thickness length (length in a direction connecting front and rear surfaces) D of the plate-shaped aluminum nitride particles may be 3 or more. The thickness length D may be a length (that is, a thickness) of a portion with a minimum distance between a pair of parallel planes that interpose the aluminum nitride particle therebetween. Further, shapes of the front and rear surfaces may be polygon such as hexagon. With the aspect ratio of 3 or more, the aluminum nitride particles are arranged regularly in the pre-firing compact as shown in FIG. 1 (the aluminum nitride particles are oriented), and the crystal orientations in the aluminum nitride sintered compact after firing are easily made to be the same.

The planar length (size in a longitudinal direction) L of the aluminum nitride particles may be 0.6 µm or more, 1 µm or more, 1.5 µm or more, or 2 µm or more. When the planar length L of the aluminum nitride particles is too small, the particles may aggregate and a highly-oriented aluminum nitride sintered compact (having a high degree of orientation of crystallographic axe) may not be obtained. Further, the planar length L of the aluminum nitride particles may be 20 µm or less, 15 µm or less, 10 µm or less, or 5 µm or less. When the planar length L of the aluminum nitride particles is too large, sintering is difficult to occur when the aluminum nitride sintered compact is manufactured, by which a density of the aluminum nitride sintered compact (relative density with respect to its theoretical density) may decrease. When the density of the aluminum nitride sintered compact is decreased, pores remain within the aluminum nitride sintered compact and the transparency of the aluminum nitride sintered compact is decreased. When the planar length L of the aluminum nitride particles is within the aforementioned range (0.6 to 20 µm), the aluminum nitride sintered compact with high orientation degree and high transparency can be manufactured. The transparency of the aluminum nitride sintered compact can be evaluated by irradiating the aluminum nitride sintered compact with light (laser) having a specific wavelength and using a linear transmittance of the light.

The thickness length (size in a short direction) D of the aluminum nitride particles may be 0.05 µm or more. When the thickness length D of the aluminum nitride particles is less than 0.05 µm, the shape of the aluminum nitride particles may deform in manufacturing the aluminum nitride sintered compact, for example, in the mixing step of the materials. Deformation of the particle shape may decrease the orientation degree of the aluminum nitride particles in forming the pre-firing compact. The thickness length D of the aluminum nitride particles may be 0.1 µm or more, 0.3 µm or more, 0.5 µm or more, or 0.8 µm or more.

Further, the thickness length D of the aluminum nitride particles may be 2 µm or less, 1.5 µm or less, 1 µm or less, or 0.5 µm or less. When the thickness length D of the aluminum nitride particles is too large, for example, upon adjustment of a thickness of the pre-firing compact by using a doctor blade, the aluminum nitride particles are more likely to receive shearing stress applied from the blade on their particle side surfaces (surfaces parallel to the thickness direction) and the arrangement of the aluminum nitride particles may thereby be disturbed (see FIG. 2). Further, when the thickness length D of the aluminum nitride particles is too large, the aspect ratio decreases as a result and arranging the aluminum nitride particles regularly becomes difficult. When the thickness length D of the aluminum nitride particles is within the aforementioned range (0.05 to 2 µm), the aluminum nitride sintered compact with high orientation degree and high transparency can be manufactured.

A specific surface area of the aluminum nitride particles may be 0.4 $m^2/g$ or more, 1 $m^2/g$ or more, 2 $m^2/g$ or more, 3.5 $m^2/g$ or more, 5 $m^2/g$ or more, or 8 $m^2/g$ or more. When the specific surface area is too small, the aluminum nitride particles are difficult to sinter when fired and the aluminum nitride sintered compact with high density may not be obtained. Further, the specific surface area may be 16 $m^2/g$ or less, 13 $m^2/g$ or less, or 10 $m^2/g$ or less. When the specific surface area is too large, the aluminum nitride particles easily aggregate and the aluminum nitride particles cannot be arranged with high orientation in the pre-firing compact, as a result of which the aluminum nitride sintered compact having the same crystal orientation may not be obtained. Further, when the specific surface area is too large, for example, upon formation of the pre-firing compact by using the doctor blade, the shearing stress applied from the blade to the aluminum nitride particles becomes small and the arrangement of the aluminum nitride particles may thereby be disturbed. When the specific surface area of the aluminum nitride particles is within the aforementioned range (0.4 to 16 µm), the pre-firing compact with high orientation can be formed, and firing this pre-firing compact can manufacture the aluminum nitride sintered compact with high orientation and high transparency.

(Impurity Concentration)

Impurities (such as metal impurity and oxygen) contained in the aluminum nitride particles are preferably less. Specifically, the metal impurity may be 0.2 wt % or less, 0.1 wt % or less, 0.07 wt % or less, or 0.05 wt % or less. Further, the oxygen content may be 2 wt % or less, 1.5 wt % or less, 1 wt % or less, or 0.9 wt % or less. The higher an impurity concentration in the aluminum nitride particles is, the higher an impurity concentration contained in the aluminum nitride sintered compact becomes accordingly. High impurity concentration in the aluminum nitride sintered compact may decrease the transparency (the linear transmittance) and/or thermal conductivity of the aluminum nitride sintered compact. When the impurity concentration in the aluminum nitride particles is within the aforementioned range (the metal impurity of 0.2 wt % or less and the oxygen content of 2 wt % or less), the aluminum nitride sintered compact with high transparency can be manufactured.

(Features of Aluminum Nitride Sintered Compact)

A degree of c-plane orientation of the aluminum nitride sintered compact (degree of c-axe orientation in the aluminum nitride crystals constituting the aluminum nitride sintered compact) may be 95% or more, 97% or more, or 100%. Further, the relative density of the aluminum nitride sintered compact may be 99% or more, 99.8% or more, or 100%. The metal impurity concentration in the aluminum nitride particles may be 0.04 wt % or less. The oxygen concentration in the aluminum nitride particles may be 0.6 wt % or less. Further, the linear transmittance of the aluminum nitride sintered compact may be 30% or more, 60% or more, or 65% or more, with light having a wavelength of 450 nm.

Embodiments

Hereinbelow, embodiments of the aluminum nitride particles and the aluminum nitride sintered compact manufactured by using the aluminum nitride particles will be described. The embodiments described hereinbelow are merely for explaining the disclosure herein and do not restrict the disclosure herein.

First Embodiment: Manufacture of Aluminum Nitride Particles

Firstly, 100 g of plate-like shaped aluminum oxide (Kinsei Matec Co., Ltd.), 50 g of carbon black (Mitsubishi Chemical Corporation), 1000 g of alumina balls (φ2 mm), and 350 mL of IPA (isopropyl alcohol: Tokuyama Corporation, Tokuso IPA) were mixed at 30 rpm for 240 minutes, to obtain a mixture thereof. As the aluminum oxide, aluminum oxide having an average particle diameter (planar length) of 5 μm, an average thickness (thickness length) of 0.07 μm, and an aspect ratio of 71 was used. The alumina balls were removed from the obtained mixture, and then the mixture was dried by using a rotary evaporator. Thereafter, the residual mixture was lightly crushed in a mortar (aggregated particles were separated with relatively weak force), and a carbon crucible was filled with 100 g of the mixture. After this, the crucible filled with the mixture was placed in a heating furnace, a temperature therein was elevated to 1600° C. at the temperature elevation rate 150° C./hr under circulation of nitrogen gas at 3 L/min, and the temperature was maintained at 1600° C. for 20 hours. The crucible was naturally cooled after the heating, and then a sample was taken out of the crucible and was heat treated at 650° C. for 10 hours under an oxidizing atmosphere by using a muffle furnace (post heat treatment), as a result of which plate-like shaped aluminum nitride particles were obtained. The post heat treatment was conducted to remove carbon remaining in the sample.

(Evaluation of Aluminum Nitride Particles)

Figure 5:
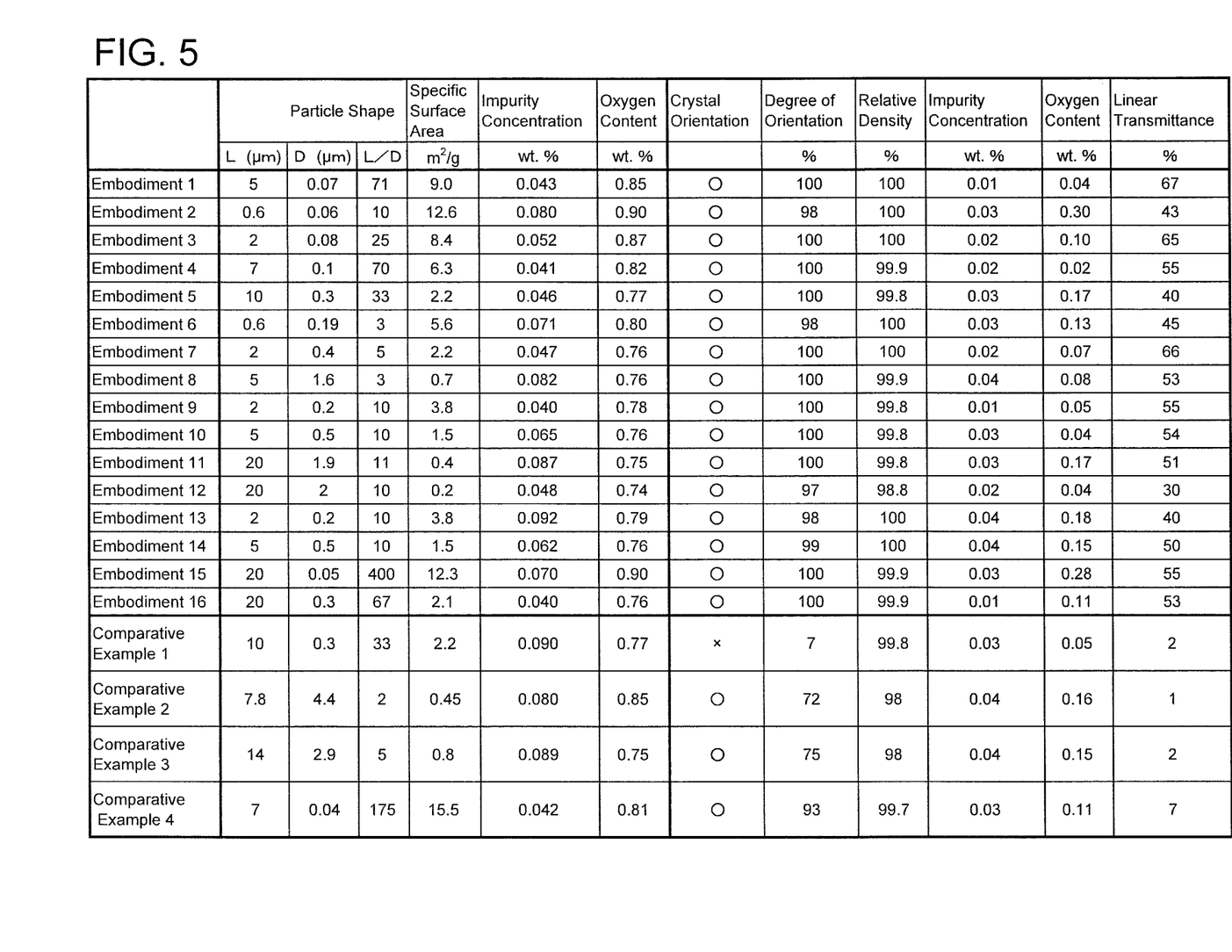
FIG. 5 shows a summary of embodiments.

The obtained aluminum nitride particles were evaluated on their particle shape, specific surface area, impurity concentration, and crystal orientation. Evaluation results are shown in FIG. 5.

(Particle Shape)

For the particle shape, images of the obtained aluminum nitride particles were captured by using a SEM (JEOL Ltd., JSM-6390) at a magnification of 1000 to 2000, 30 particles were randomly selected from the captured images, and their planar lengths (particle diameters) and thickness lengths were measured. Further, their aspect ratios were calculated from the planar lengths and the thickness lengths. As shown in FIG. 5, the shape of the obtained aluminum nitride particles was substantially the same as that of the material (aluminum oxide).

(Specific Surface Area)

The specific surface area of the aluminum nitride particles was measured by a BET method described in JIS (Japanese Industrial Standard) R1626, using a specific surface area measurement apparatus (Shimadzu Corporation, Flow Sorb 2300). Nitrogen was used as adsorption gas. The result is shown in FIG. 5. The specific surface area was 9.0 m²/g.

(Impurity Concentration)

Measurement of the metal impurity concentration was conducted by a pressurized sulfuric acid decomposition method described in JIS R1649, using an ICP (Inductively Coupled Plasma) emission analysis apparatus (Hitachi High-Tech Science Corporation, PS3520UV-DD). Si, Fe, Ti, Ca, Mg, K, Na, P, Cr, Mn, Ni, Zn, Ga, Y, and Zr were measured as metal impurity. Further, measurement of the oxygen concentration was conducted by an inert gas fusion-infrared absorption method described in JIS R1675, using an oxygen analysis apparatus (Horiba Ltd., EMGA-6500). As shown in FIG. 5, the metal impurity concentration was 0.043 wt % and the oxygen concentration was 0.85 wt %.

(Crystal Orientations)

Measurement of the crystal orientations was evaluated using an EBSD (Oxford Instruments Co., Ltd., Aztec HKL) attached to the SEM. The evaluation on the crystal orientations was conducted on the front or rear surfaces of the aluminum nitride particles. That is, the evaluation was conducted on a crystal morphology of a surface which perpendicularly intersects the thickness direction of each aluminum nitride particle (front or rear surface) and which has a largest area among surfaces constituting the aluminum nitride particle. Specifically, the front surfaces (or rear surfaces) of the aluminum nitride particles were mapped for each crystal orientation and a ratio of (001) planes (area ratio) to the total was calculated to determine whether the aluminum nitride particles have the same crystal orientation or not. In a case of the area ratio 80% or more, the aluminum nitride particles were determined as having the same crystal orientation, whereas in a case of the area ratio less than 80%, the aluminum nitride particles were determined as not having the same orientation. FIG. 5 indicates the case of having the same crystal orientation with "○" and the case of not having the same crystal orientation with "x". As shown in FIG. 5, the obtained aluminum nitride particles had the same crystal orientation. Surfaces of the aluminum nitride particles were observed by using the above SEM after the measurement of the crystal orientations, to determine whether the particles are monocrystalline (free from surface unevenness) or polycrystalline (with surface unevenness) based on their surface unevenness states. The obtained aluminum nitride particles were monocrystalline.

(Manufacture of Aluminum Nitride Sintered Compact)

A method of manufacturing an aluminum nitride sintered compact by using the obtained aluminum nitride particles will be described. Firstly, a method of synthesizing an auxiliary agent (Ca—Al—O-based firing auxiliary agent) that is used when the aluminum nitride sintered compact is manufactured will be described. The auxiliary agent is mixed in the aluminum nitride particles and is fired with the aluminum nitride particles.

(Synthesis of Auxiliary Agent)

47 g of calcium carbonate (Shiraishi Calcium Co., Ltd., Shilver-W), 24 g of γ-alumina (Taimei Chemicals Co., Ltd., TM-300D), 1000 g of alumina balls (φ15 mm), and 125 mL of IPA (Tokuyama Corporation, Tokuso IPA) were crushed and mixed at 110 rpm for 120 minutes, to obtain the mixture thereof. The obtained mixture was dried by using a rotary evaporator. The alumina balls were thereafter removed from the mixture, and an aluminum crucible was filled with 70 g of the mixture. After this, the crucible filled with the mixture was placed in a heating furnace, a temperature therein was elevated to 1250° C. at the temperature elevation rate 200° C./hr in air, and the temperature was maintained at 1250° C. for 3 hours. The crucible was naturally cooled after the heating, and then the mixture (auxiliary agent) was taken out of the crucible.

(Preparation of Synthesis Material)

Next, a process of preparing a material by using the above-described auxiliary agent will be described. 4.8 parts of the auxiliary agent (Ca—Al—O-based auxiliary agent) was added to the above-described aluminum nitride particles and the mixture thereof was scaled to be at a total of 20 g. This mixture, 300 g of alumina balls (φ15 mm), and 60 mL of IPA (Tokuyama Corporation, Tokuso IPA) were mixed at 30 rpm for 240 minutes. The alumina balls were removed from the obtained mixture and the mixture was dried by using a rotary evaporator to obtain the synthesis material.

(Fabrication of Pre-Firing Compact)

7.8 parts of polyvinyl butyral (Sekisui Chemical Co., Ltd., Product No. BM-2) as a binder, 3.9 parts of di(2-ethylhexyl) phthalate (Kurogane Kasei Co., Ltd.) as a plasticizer, 2 parts of sorbitan trioleate (Kao Corporation, Rheodol SP-O30) as a dispersant, and 2-ethylhexanol as a dispersion medium were added to 100 parts of the above-described synthesis material and mixed therewith, to prepare material slurry. The added amount of the dispersion medium was adjusted such that the slurry has viscosity of 20000 cP. The obtained material slurry was formed on a PET film by the doctor blade method. By using the doctor blade method, the material slurry was formed on the PET film so that the plate surfaces (c planes) of the aluminum nitride particles are arranged on a surface of the PET film. A thickness of the slurry was adjusted to be 30 μm after drying. A sheet-shaped tape compact was obtained by the foregoing processes. The obtained tape compact was cut into circles with a diameter of 20 mm and 120 pieces of the circular tape compacts were laminated, to obtain a pre-firing compact. After the obtained pre-firing compact was placed on an aluminum plate having a thickness of 10 mm, it was placed within a vacuum package and an inside thereof was then vacuumed. After this, the vacuum package was subjected to isostatic pressing at 100 kgf/cm² in hot water of 85° C., by which a disk-shaped pre-firing compact (laminate to be fired) was obtained.

(Primary Firing)

Next, the pre-firing compact was placed in a degreasing furnace and degreased at 600° C. for 10 hours. After this, the compact was fired at 1900° C. for 10 hours under a surface pressure of 200 kgf/cm² and then the temperature was lowered to a room temperature, to obtain a primary aluminum nitride sintered compact. A pressurizing direction in the hot pressing was set to a laminate direction of the pre-firing compact (direction substantially perpendicular to front surfaces of the tape compacts). Further, the pressurization was maintained until the temperature was lowered to the room temperature. The aluminum nitride particles, which had constituted the pre-firing compact, are grown and pores in the compact are eliminated by the primary firing, thus the primary aluminum nitride sintered compact with high density (relative density) is thereby obtained.

(Secondary Firing)

A surface of the primary aluminum nitride sintered compact was ground to fabricate a sample with φ20 mm and thickness 1.5 mm. This sample was placed on an aluminum nitride plate, a heating furnace was provided with a nitrogen atmosphere, and the sample was fired at a firing temperature of 1900° C. for 75 hours, to obtain an aluminum nitride sintered compact. The auxiliary agent remaining in the primary aluminum nitride sintered compact (auxiliary agent that was used upon the sintering) was removed by the secondary firing, and the transparent aluminum nitride sintered compact is thereby obtained.

(Evaluation of Aluminum Nitride Sintered Compact)

The obtained aluminum nitride sintered compact was evaluated on its degree of c-plane orientation (degree of c-axe orientations), relative density, impurity concentration, and linear transmittance. Evaluation results are shown in FIG. 5.

(Degree of C-Plane Orientation)

After the surface of the aluminum nitride sintered compact was polished, the polished surface was irradiated with X ray to measure the degree of c-plane orientation. Specifically, an XRD profile was measured in a range of 2θ=20 to 70° by using an XRD apparatus (Rigaku Corporation, RINT-TTR III) and CuKα ray under a condition of a voltage 50 kV and current 300 mA. The degree of c-plane orientation (f) was calculated by a Lotgering method. Specifically, it was calculated by substituting results P, $P_0$ obtained by following equations (3), (4) to an equation (2). In the equations, P is a value obtained from the XRD measurement of the obtained aluminum nitride sintered compact, and $P_0$ is a value calculated from standard aluminum nitride (JCPDS Card No. 076-0566). (100), (002), (101), (102), (110), and (103) were used as (hkl).

$$f=\{(P-P_0)/(1-P_0)\}\times 100 \quad (2)$$

$$P_0=\Sigma I_0(002)/\Sigma I_0(hkl) \quad (3)$$

$$P=\Sigma I(002)/\Sigma I(hkl) \quad (4)$$

(Relative Density, Impurity Concentration)

In regard to the relative density, a bulk density was measured by a method described in JIS R1634 and a value with respect to the theoretical density (3.260) was calculated. Further, the impurity concentration was measured by the same method as the one used for the evaluation of the impurity concentration of the aluminum nitride particles.

(Linear Transmittance)

The aluminum nitride sintered compact after sintering was cut into pieces with a size of 10 mm×10 mm, and four pieces of the aluminum nitride sintered compact were fixed to an outer peripheral portion of an alumina surface plate (φ68 mm) at regular intervals (such that an angle formed by a center of the surface plate and adjacent pieces of the aluminum nitride sintered compact is 90°), were polished by a copper lapping machine onto which slurry containing diamond abrasive grains with particle diameters of 9 μm and 3 μm was applied, and were further polished for 300 minutes by a buffing machine onto which slurry containing colloidal silica was applied. After this, the polished samples with the size of 10 mm×10 mm×thickness of 0.4 mm were cleaned by acetone, ethanol, and ion exchanged water in this order for 3 minutes, and then the linear transmittance at a wavelength of 450 nm was measured by using a spectrophotometer (Perkin Elmer, Lambda900).

As shown in FIG. 5, as a result of the manufacture of the aluminum nitride sintered compact using the aluminum nitride particles obtained in the embodiment, the aluminum nitride sintered compact that has the degree of c-plane orientation of 100%, the relative density of 100%, the metal impurity of 0.01 wt %, the oxygen content of 0.04%, and the linear transmittance of 67% was obtained.

Second to Fifth Embodiments

Aluminum nitride particles were manufactured by the same method as that of the first embodiment with aluminum oxide of different sizes (Kinsei Mantec Co., Ltd.), and aluminum nitride sintered compacts were manufactured by using the obtained aluminum nitride particles. Further, for all of the obtained samples, their degrees of c-plane orientation, relative densities, and impurity concentrations were measured. Further, their linear transmittances were measured. In the second to fifth embodiments as well, shapes of the obtained aluminum nitride particles were substantially the same as those of their material (aluminum oxide). Due to this, the shapes of the aluminum nitride particles shown in FIG. 5 are substantially the same as the sizes of aluminum oxide of the material.

In preparation of a synthesis material for the aluminum nitride sintered compact in the fifth embodiment, 47.6 wt % of commercially-available spherical aluminum nitride powder (Tokuyama Corporation, Grade F, average particle diameter 1.2 μm) and 4.8 wt % of auxiliary agent were mixed with 47.6 wt % of the aluminum nitride particles, the mixture was mixed with 300 g of alumina balls (φ15 mm) and 60 mL of IPA (Tokuyama Corporation, Tokuso IPA) at 30 rpm for 240 minutes, and then the alumina balls were removed and the mixture was dried using a rotary evaporator, to obtain the synthesis material. As shown in FIG. 5, since the aluminum nitride particles of the fifth embodiment have a relatively large particle diameter, using the particles as they are in the manufacture of the aluminum nitride sintered compact may become an obstruction to increasing the relative density. In order to increase the relative density of the aluminum nitride sintered compact, the aluminum nitride powder with the small particle diameter was added to the synthesis material in the fifth embodiment. The aluminum nitride powder with the small particle diameter is integrated into the aluminum nitride particles upon when the aluminum nitride particles grow. Due to this, adding such aluminum nitride powder with the small particle diameter to the synthesis material will not affect crystal orientations in the aluminum nitride sintered compact. This is known as a TGG (Templated Grain Growth) method.

Sixth to Sixteenth Embodiments

In order to evaluate aluminum nitride particles with various sizes, aluminum oxide particles, which are the material of aluminum nitride particles, were synthesized for sizes that were not commercially available, aluminum nitride particles were manufactured by using the synthesized aluminum oxide particles, and aluminum nitride sintered compacts were manufactured by using those aluminum nitride particles.

(Synthesis of Aluminum Oxide Particles)

Gibbsite-type aluminum hydroxide was wet-crushed to have an average particle diameter of 0.4 to 3 μm and $1.0 \times 10^{-5}$ to $1.0 \times 10^{-2}$ mol of orthophosphoric acid was added to 1 mol of the aluminum hydroxide, to form slurry. The larger the average particle diameter of aluminum hydroxide is, the larger the average particle diameter of aluminum oxide particles becomes, and the larger the added amount of orthophosphoric acid is, the larger the aspect ratio becomes.

The obtained slurry was subjected to granulation drying at a drying temperature of 140° C. by using spray drying (Ohkawara Kakohki Co., Ltd., FL-12 Model), to make water content in the material less than 1 wt %. The obtained powder was prepared as aqueous slurry of 50 wt %, and then hydrothermal synthesis was conducted thereon at a synthesis temperature of 600° C. and a pressure of 15 MPa. After the hydrothermal synthesis, water cleaning and drying were carried out to obtain white aluminum oxide particles. A part of the orthophosphoric acid may not be added upon the formation of the slurry and may be added to water used in the hydrothermal synthesis, by which a particle diameter of the aluminum oxide particles can be decreased without changing the aspect ratio thereof. Aluminum nitride particles and aluminum nitride sintered compacts were manufactured by using the obtained aluminum oxide and the same method as that of the first embodiment, and physical property evaluation was conducted thereon.

In the sixth to sixteenth embodiments as well, shapes of the obtained aluminum nitride particles were substantially the same as those of their material (aluminum oxide). The shapes of the aluminum nitride particles shown in FIG. 5 are substantially the same as sizes of aluminum oxide of the material. Further, in regard to the eleventh, thirteenth and fourteenth embodiments, the commercially-available spherical aluminum nitride powder was added to the aluminum nitride particles upon preparation of the synthesis materials for the aluminum nitride sintered compacts, similar to the fifth embodiment. The aluminum nitride particles of the first to eleventh embodiments and the thirteenth to sixteenth embodiments had substantially hexagonal surfaces. That is, the aluminum nitride particles of the first to eleventh embodiments and the thirteenth to sixteenth embodiments had a substantially hexagonal column shape. The aluminum nitride particles of the twelfth embodiment had round surfaces and had a cylindrical shape.

The aluminum nitride sintered compacts using the aluminum nitride particles obtained in the second to sixteenth embodiments had the degrees of c-plane orientation of 97% or more, the relative densities of 98.8% or more, the metal impurities of 0.04 wt % or less, the oxygen contents of 0.30% or less, and the linear transmittances of 30% or more. The aluminum nitride particles of the second and sixth embodiments have relatively small sizes compared to the other samples. On the other hand, the aluminum nitride particles of the eleventh, twelfth, fifteenth, and sixteenth embodiments have relatively large sizes compared to the other samples. All of the samples had excellent degrees of c-plane orientation and linear transmittances. The sixth to eighth embodiments have relatively small aspect ratios compared to the other samples. It has been confirmed that the samples with the aspect ratios of 3 to 5 also exhibit excellent degrees of c-plane orientation and linear transmittances.

Comparative Example 1

An alumina crucible was filled with commercially-available aluminum oxide with an average particle diameter of 10 μm, an average thickness of 0.3 μm, and an aspect ratio of 33, a temperature thereof was elevated to 1600° C. at the temperature elevation rate 200° C./hr under circulation of nitrogen gas at 0.5 L/min, and the temperature was maintained at 1600° C. for 35 hours, to obtain plate-like shaped aluminum nitride particles. In the manufacture of the aluminum nitride particles, the other conditions were the same as those of the first embodiment. An aluminum nitride sintered compact was manufactured by the same method as that of the first embodiment by using the obtained aluminum nitride particles. Results are shown in FIG. 5. As shown in FIG. 5, the aluminum nitride particles of the comparative example 1 do not have the same crystal orientation and they were polycrystalline. The aluminum nitride particles of the comparative example 1 exhibited almost the same particle shape, specific surface area, and impurity concentration as those of the fifth embodiment, however, the aluminum nitride sintered compact thereof exhibited the degree of c-plane orientation of 7%, which is an extremely low value, and the linear transmittance of 2%.

Comparative Examples 2 to 4

Aluminum oxide particles were synthesized by the same method as that of the sixth to sixteenth embodiments, and aluminum nitride particles and aluminum nitride sintered compacts were manufactured by using the synthesized aluminum oxide. In comparative examples 2 to 4, an average particle diameter of aluminum hydroxide, an added amount of orthophosphoric acid, and timing at which the orthophosphoric acid is added were adjusted to obtain aluminum oxide particles having particle shapes as shown in FIG. 5. The shapes of the aluminum nitride particles shown in FIG. 5 are substantially the same as sizes of aluminum oxide of the material. In the comparative examples 2 and 3, the aluminum nitride particles had the same crystal orientation, however, their degrees of c-plane orientation in the aluminum nitride sintered compacts were low. Further, their relative density was low compared to the other samples. In the comparative example 4, the aluminum nitride particles had the same crystal orientation, the degree of c-plane orientation of the aluminum nitride sintered compact was better than those of the comparative examples 2 and 3, and the relative density was at about the same level as those of the first to sixteenth embodiments. However, in all of the comparative examples 2 to 4, their linear transmittances were 7% or less, which are low.

The results of the above-described embodiments will be summarized. The aluminum nitride sintered compacts fabricated by using the samples of the first to sixteenth embodiments all achieved the high degrees of c-plane orientation of 97% or more. Further, they also achieved the high relative densities of 98.8% or more. Even in the twelfth embodiment, which has the lowest degree of c-plane orientation and the lowest relative density among the first to sixteenth embodiments, the linear transmittance exhibited the excellent result of 30%. Especially the aluminum nitride sintered compacts of the first, third, and seventh embodiments, which have the degree of c-plane orientation of 100% and the relative density of 100%, had their linear transmittances of 65% or more, which are significantly superior results.

In the case where the aluminum nitride particles did not have the same crystal orientation, the degree of c-plane orientation of the aluminum nitride sintered compact significantly decreased (the comparative example 1). As a result, the aluminum nitride sintered compact with a high linear transmittance could not be obtained.

In the case where the aspect ratio of the aluminum nitride particles was small (less than 3), the degree of c-plane orientation of the aluminum nitride sintered compact decreased (the comparative example 2). Further, the relative density was low compared to those of the first to sixteenth embodiments. As a result, the aluminum nitride sintered compact with a high linear transmittance could not be obtained.

In the case where the size (thickness length D) of the aluminum nitride particles was too large, the degree of c-plane orientation of the aluminum nitride sintered compact decreased and the relative density was low compared to those of the first to sixteenth embodiments (the comparative example 3). As a result, the aluminum nitride sintered compact with a high linear transmittance could not be obtained.

In the case where the size (thickness length D) of the aluminum nitride particles was too small, the degree of c-plane orientation of the aluminum nitride sintered compact decreased and the aluminum nitride sintered compact with a high linear transmittance could not be obtained (the comparative example 4).

While specific examples of the present disclosure have been described above in detail, these examples are merely illustrative and place no limitation on the scope of the patent claims.

The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:

1. Aluminum nitride particles used as a material of an aluminum nitride sintered compact, wherein
the aluminum nitride particles have a same crystal orientation, and
the aluminum nitride particles each have an aspect ratio of 3 or more; a plate-like shape; a planar length of 0.6 µm or more and 20 µm or less; and a thickness length of 0.05 µm or more and 1.9 µm or less.

2. The aluminum nitride particles according to claim 1, wherein a surface area is 0.4 m$^2$/g or more and 16 m$^2$/g or less.

3. The aluminum nitride particles according to claim 2, wherein a metal impurity concentration in the particles is 0.2 mass % or less.

4. The aluminum nitride particles according to claim 3, wherein an oxygen concentration in the particles is 2 mass % or less.

5. The aluminum nitride particles according to claim 1, wherein a metal impurity concentration in the particles is 0.2 mass % or less.

6. The aluminum nitride particles according to claim 1, wherein an oxygen concentration in the particles is 2 mass % or less.

7. The aluminum nitride particles according to claim 2, wherein an oxygen concentration in the particles is 2 mass % or less.

8. The aluminum nitride particles according to claim 5, wherein an oxygen concentration in the particles is 2 mass % or less.

\* \* \* \* \*